United States Patent
Vyas

(10) Patent No.: US 11,159,625 B1
(45) Date of Patent: Oct. 26, 2021

(54) EFFICIENTLY DISTRIBUTING CONNECTIONS TO SERVICE INSTANCES THAT STREAM MULTI-TENANT DATA

(71) Applicant: salesforce.com, inc., San Francisco, CA (US)

(72) Inventor: Varun Vyas, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/013,050

(22) Filed: Sep. 4, 2020

(51) Int. Cl.
*G06F 15/16* (2006.01)
*H04L 29/08* (2006.01)

(52) U.S. Cl.
CPC ........ *H04L 67/146* (2013.01); *H04L 67/1027* (2013.01); *H04L 67/141* (2013.01); *H04L 67/142* (2013.01)

(58) Field of Classification Search
CPC . H04L 67/146; H04L 67/1027; H04L 67/141; H04L 67/142
USPC .......... 709/202–203, 227–228; 718/104–105
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |

(Continued)

*Primary Examiner* — Bharat Barot
(74) *Attorney, Agent, or Firm* — Dergosits & Noah LLP; Todd A. Noah

(57) ABSTRACT

Described is a system (and method) for efficiently distributing connections to service instances that stream multi-tenant data. The system may efficiently distribute requests to stream data by grouping (or "binning") requests for a particular topic stream to a service instance that is elected a leader for that topic. The election of the leaders may be coordinated by the service instances themselves. The service instances may initiate the redistribution of the requests to the elected leaders by updating a cookie of a client to identify the service instance determined to be the elected leader of the requested topic stream. This cookie may be respected by a load balancer when directing clients to particular service instances. For example, the load balancer may be configured to implement session persistence (or session stickiness, session affinity, etc.) between the client and service instances based on the cookie.

20 Claims, 6 Drawing Sheets

(56) References Cited

U.S. PATENT DOCUMENTS

| | | | |
|---|---|---|---|
| D454,139 S | 3/2002 | Feldcamp et al. | |
| 6,367,077 B1 | 4/2002 | Brodersen et al. | |
| 6,377,996 B1* | 4/2002 | Lumelsky | H04L 65/1043 |
| | | | 709/203 |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpobier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,730,478 B2 | 6/2010 | Weissman | |
| 7,739,384 B2* | 6/2010 | Siev | H04L 67/1031 |
| | | | 709/227 |
| 7,779,039 B2 | 8/2010 | Weissman et al. | |
| 7,779,475 B2 | 8/2010 | Jakobson et al. | |
| 7,788,380 B2* | 8/2010 | Shim | H04L 67/1008 |
| | | | 709/226 |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,103,770 B1* | 1/2012 | Masters | H04L 67/1027 |
| | | | 709/225 |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,667,750 B2* | 5/2017 | Bute | H04L 67/145 |
| 10,747,592 B2* | 8/2020 | Kolodzieski | G06F 9/542 |
| 10,826,984 B2* | 11/2020 | Madani | H04L 67/1051 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |
| 2018/0139269 A1* | 5/2018 | Wu | H04L 67/101 |

* cited by examiner

EFFICIENTLY DISTRIBUTING CONNECTIONS TO SERVICE INSTANCES THAT STREAM MULTI-TENANT DATA

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This disclosure relates to data streaming systems, and more particularly, efficiently distributing streaming requests amongst instances of a streaming service.

BACKGROUND

Various on-demand (or cloud-based) customer relationship management (CRM) software tools exist to aid organizations with managing interactions with customers and potential customers. These tools, however, rely on vast amounts of data that often results in unique data processing challenges. For example, managing such large amounts of data (e.g. millions of records from thousands of tenants) requires efficient mechanisms for distributing the data to various types of applications for processing. For example, applications may rely on a stream processing framework to obtain real-time events (e.g. data) to provide various application functionality. In current streaming systems (e.g. based on the Apache Kafka™ platform), these events may be organized into topics (e.g. categories, stream names, feeds, etc.) and partitions within topics. Ideally, when modelling stream consuming applications, events associated with a particular tenant would be assigned to a distinct topic (or partition) for management. However, due to the sheer number of events and tenants associated with certain CRM databases, such a modelling approach may not be suitable for the capabilities of the streaming framework. Accordingly, events associated with multiple tenants may be multiplexed onto an aggregate topic. For example, each aggregate topic may be used for multiple tenants or for multiple topics available to each tenant. While the events are persisted based on an aggregate topic, these events are generated and consumed based on initial topics that are different from the aggregate topics. Since many initial topics and/or associated initial partitions share a given physical storage channel (or physical resource) associated with an aggregate topic, if an event consumer requests the events based on the aggregate topic, when receiving the events, the event consumer potentially needs to skip (or drop) a large number of events to obtain data from the initial topic. This inefficiency may be exacerbated when employing multiple servers (or application instances) that serve such aggregate topics. For example, requests from multiple consumers that require the same initial topic may be spread across multiple servers, and thus, each server may provide a large number of events that are ultimately skipped. Accordingly, there is continued need to implement efficient distribution techniques when streaming data associated with a large multi-tenant environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
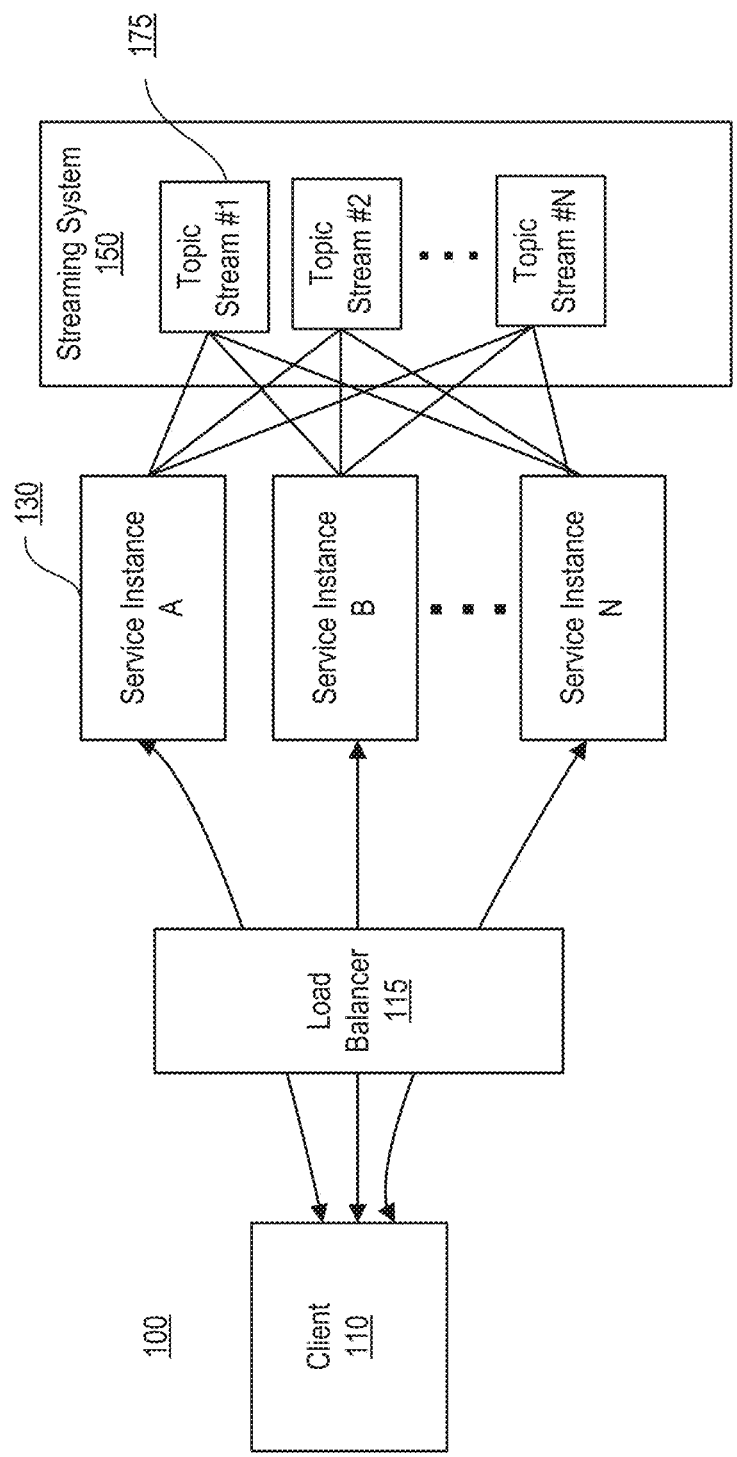
FIG. 1 is a block diagram illustrating an example overview of an operating environment for distributing requests to stream data amongst service instances according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for efficiently distributing connections to service instances that stream multi-tenant data. As described, data associated with multiple tenants may be multiplexed onto particular topics streams (e.g. aggregate topic streams). Accordingly, when multiple client (e.g. consumer) requests for the same topic stream are spread across multiple service instances (e.g. servers), each instance read multiplexed data that may ultimately be skipped (or dropped) by the service instance. This leads to inefficient resource utilization. Thus, the system of some embodiments described herein may more efficiently distribute such requests by grouping (or "binning") requests for a particular topic stream to a service instance that is elected a leader for that topic. As a result, service instances may employ certain techniques to efficiently provide data of the topic stream to which is it elected a leader. For example, to improve efficiency, the service instance may employ certain caching techniques to serve data. The election of the leaders may be coordinated by the service instances themselves (e.g. at the application or service level). For example, the service instances may elect leaders using a consensus protocol (or algorithm).

In addition, the service instances may initiate the redistribution (or rerouting) of streaming requests to the elected leaders. To perform such redistribution, the service instances may leverage the capabilities of a load balancer that initially directs the requests. For example, when a client initially submits a request to stream data from a topic stream, the load balancer may direct the client to a particular service instance based on a default load balancing scheme. However, the particular service instance to which the client was directed, may determine which service instance has been elected a leader for the requested topic stream. For example, the service instance may reference a mapping table that is stored as part of a distributed cache managed by the service instances.

Upon determining the elected leader, the service instance may update a cookie of the client to identify the service instance determined to be the elected leader of the requested topic stream. This cookie may be respected by a load balancer when directing clients to particular service instances. For example, the load balancer may be configured to read the cookie to implement session persistence (or session stickiness, session affinity, etc.) such that all requests from a particular client device get directed to the same service instance for a duration of a communication session. After updating the cookie, the service instance may initiate a process for the client to resubmit a request for the topic stream. For example, the resubmission may include the client retrying to create a communication session with the service (or instance thereof). However, this time the load balancer may determine the cookie of the client specifies a particular service instance, and accordingly, directs the client to the service instance elected as the leader for the requested topic. In other words, the service instances may leverage the configuration of the load balancer to indirectly reroute requests based on service-defined information (e.g. elected leaders). Accordingly, the management of efficiently redistributing streaming requests may be abstracted from the load balancer and independently coordinated by the service instances.

FIG. 1 is a block diagram illustrating an example overview of an operating environment 100 for distributing requests to stream data amongst instances of a service according to one or more embodiments of the disclosure. In some embodiments, the environment (or system) 100 may be part of, or work in conjunction with, an on-demand database environment (e.g. environment 10 as further described herein). For example, one or more of the load balancer 115, service instances 130, and streaming system 150 may be part of, or work in conjunction with, an application platform (e.g. application platform 18 as further described herein) that is part of an on-demand database service (or system). The components of environment 100 may interact via a network, which may be any type of wired or wireless network including a local area network (LAN), a wide area network (WAN), or a direct communication link, or other suitable connection.

In general, the environment 100 may include a client (or client device) 110 that obtains data processed by a streaming system 150 by connecting to a streaming service (or service), and more particularly, one or more instances of the service (e.g. services instances 130). A load balancer 115 may distribute requests to stream data by directing the client 110 to a particular service instance 130. As shown, each of these service instances 130 may provide data from one or more topic streams 175. As described, each of these topics streams 175 may be an aggregate topic stream that includes data associated with multiple tenants of a multi-tenant database system (e.g. database system 16 as further described herein).

Client 110 may be a device or application that obtains data processed by the streaming system 150 by connecting to a service instance 130. A service (or microservice) may be an application (or resource, endpoint, etc.) that allows a client 110 to read (e.g. subscribe, consume, etc.) data that is organized into topic streams 175. In some embodiments, the streaming system 150 may be a distributed data streaming platform allowing applications to read, write, store, and process data using data pipelines. In some embodiments, the streaming system 150 may ingest data from a database system and process the data in real-time. For example, the streaming system 150 may provide an ordered time series event log which is consumed by the client 110. For example, the client 110 may consume the log and track processed messages (e.g. events) using the offsets of the log. In some embodiments, the streaming system 150 may be implemented on the Apache Kafka™ platform. As a distributed system, Kafka may execute as part of a cluster, and each node may be referred to as a broker, which stores events in the even log. It should be noted that the streaming system 150 may be based on different messaging and queuing implementations. As referred to herein, "data," "data stream," and the like are broadly defined to include various types of records, events, objects, messages, etc. that may be obtained, or derived from, information stored by the streaming system 150 or an associated database system. In some embodiments, the client 110 may be part of user system 12, or database system 16, as further described herein.

The load balancer 115 may responsible for distributing requests (e.g. from the client 110) to connect with a service instance 130. In some embodiments, the load balancer 115 may perform a distribution based on a load balancing scheme. For example, by default, the load balancer 115 may direct requests based on the load balancing scheme (e.g. direct the request to the instance with the least amount of load). However, the load balancer 115 may be configured to implement session persistence (or sticky sessions, session affinity, etc.) between the client 110 and the service instances 130. For example, session persistence may include creating a binding (or affinity) between the client device 110 and a service instance 130 to ensure requests from the client 110 get directed to the same service instance 130 during a session. In some embodiments, the load balancer 115 may implement session persistence using a cookie as further described herein. For example, the load balancer 115 may read an attribute (or field) of a cookie associated with the client 110 to identify a resource (e.g. a server hosting a service instance 130) to which requests of the client 110 should be routed for a duration of a communication session. In some embodiments, the cookie managed by the service (e.g. application controlled session persistence) may override a cookie that may be managed by the load balancer 115.

As described, the topic streams 175 may include data associated with multiple tenants. As described, due to such a configuration, when the client 110 requires a subset of the data stream such as data from a particular tenant, data associated with other tenants may be skipped (or dropped) by one or more service instances 130. To potentially reduce the amount of skipped data served by one or more service instances 130 (e.g. that may stream the same topic stream in parallel), the service instances 130 may perform a specialized coordination process. An example of such a coordinated process is further described with reference to FIG. 2.

Figure 2:
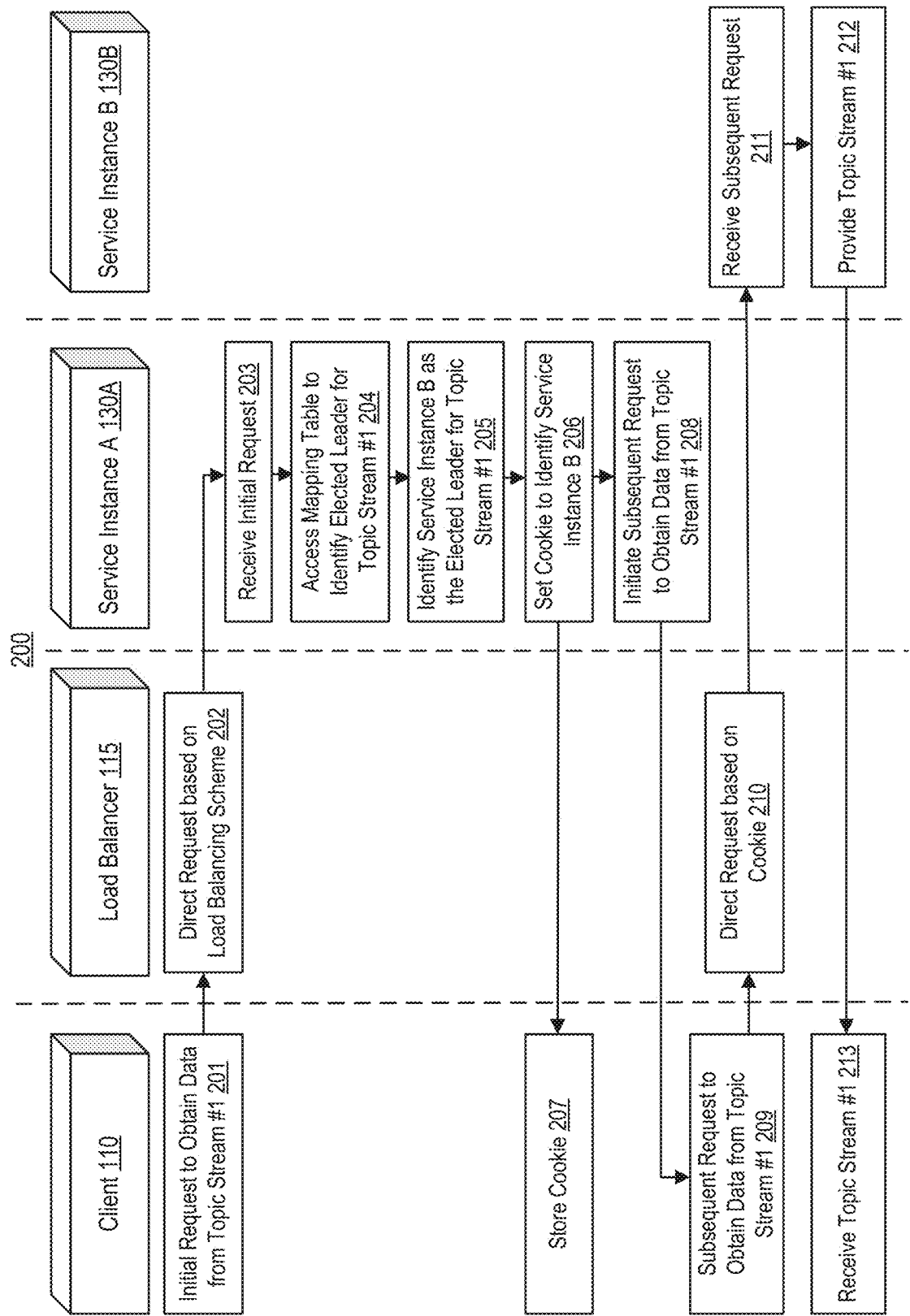
FIG. 2 is a process flow diagram illustrating an example interaction between components to distribute requests to stream data amongst service instances using a cookie according to one or more embodiments of the disclosure.

FIG. 2 is a process flow diagram 200 illustrating an example interaction between components when distributing requests to stream data amongst service instances (e.g. service instances 130) using a cookie according to one or more embodiments of the disclosure.

As shown, distributing requests to stream data may involve an interaction between a client 110, a load balancer 115, and one or more services instances (e.g. service instance A 130A, and service instance B 130B). When interacting with a streaming system (e.g. streaming system 150), the client 110 may submit an initial request (e.g. first request) to obtain (or subscribe to) data provided by a streaming service (or instances thereof). For example, in 201, the client 110 may submit an initial request to obtain data from topic stream #1. In some embodiments, the initial request may include a first attempt to connect to the service. For example, the request may include an HTTP request to connect to the service. For example, an application of the client 110 may connect to the service using an API (e.g. HTTP-based API) provided by the streaming system. The streaming system may provide multiple instances of a service (e.g. on multiple resources) to handle the subscription load for topic streams. Accordingly, the streaming system may distribute requests to subscribe to a data stream amongst the instances of the service, which in this example, include service instance A 130A (e.g. a first instance of the service), and service instance B 130B (e.g. a second instance of the service).

In some embodiments, the streaming system may employ a load balancer 115. For example, the load balancer 115 may intercept a request (e.g. of operation 201) and direct the request to a particular server (e.g. physical or virtual resource) that hosts a particular service instance. When directing the request, the load balancer 115 may reference a load balancing scheme (or policy, setting, configuration, etc.). For example, when the client 110 submits the initial request, in 202, the load balancer 115 may direct (or distribute, route, etc.) the initial request to service instance A 130A based on the load balancing scheme. The load balancing scheme may implement any suitable technique to distribute the requests amongst the service instances. In some embodiments, the load balancer 115 may also distribute requests to maintain session persistence (e.g. session stickiness) based on a cookie of the client device 110. However, when a particular service instance is not identified as part of a cookie, for example, when the client 110 submits an initial request to connect with the service, the load balancer 115 may, as a default, direct the request based on the load balancing scheme. For example, the load balancer 115 may determine the server hosting service instance A 130A has the lowest current load.

Next, in 203, service instance A 130A may receive the initial request. In some embodiments, receiving the initial request to obtain data may include establishing (or attempting to establish) a communication session (or session) between the client 110 and the particular instance of the service (e.g. service instance A 130A). In some embodiments, the communication session may include a long polling session. For example, the client 110 may attempt to establish a long polling session with service instance A 130A.

Next, an analysis may then be performed to determine whether the client 110 has been directed to the service instance identified as the leader for the requested topic stream. A leader for each of the topic steams may be elected in order to more efficiently distribute the requests. As described, data associated with multiple tenants (or clients) may be multiplexed onto a single topic stream, accordingly, the default load balancing scheme used for distribution of subscription request may be inefficient. Accordingly, the service (or instances thereof) may add an additional layer of logic to distribute requests by assigning leaders to topic streams. The elected leaders may then be the preferred instance of the service to stream data for the request topic stream. In order to assign an instance of the service as a leader for a particular topic stream, the service instances may perform an election process. In some embodiments, the service instances may perform an election process using a consensus protocol (or algorithm). For example, the consensus protocol may be used to coordinate tasks between the service instances such as electing a leader for a particular topic stream and maintaining the mapping table.

In some embodiments, the members of the consensus (e.g. instances of the service) may vote when being scheduled for tasks. Accordingly, in some embodiments, the election of leaders may be performed independently by the service instances. The service instances may perform the consensus protocol upon discovery of a new topic stream, as part of a scheduled election process, or in real-time (or near real-time) in response to determining a leader for a particular topic stream has not been elected. The elected leaders of the topic streams may then be stored as part of a mapping table. For example, the mapping table may store one or more topic streams, and the service instances that have been elected as leaders for those topics streams. The mapping table may include any suitable data structure that associates (or maps) topic streams with leaders of those streams. In some embodiments, the mapping table may be maintained by the service instances. For example, the mapping table may be stored as part of a distributed cache that is accessed by the instances of the service.

Returning to diagram 200, in 204, service instance A 130A may access the mapping table to identify the elected leader for topic stream #1. As shown in 205, after referencing the mapping table, service instance A 130A may identify (or determine) service instance B 130B is the elected leader for topic stream #1. In some embodiments, before accessing the mapping table, a determination may be made whether the initial request has already been directed to the elected leader of the request topic stream. For example, the instance elected as the topic leader may also have been the service instance with the lowest current load. In some embodiments, this determination may be made in an efficient manner such as by leveraging a bloom filter. For example, the bloom filter may be derived from the mapping table to rapidly indicate whether service instance A is the leader for topic stream #1, and thus, forego unnecessarily accessing the mapping table if service instance A is the elected leader.

After determining service instance B 130B is the elected leader of topic stream #1, in 206, service instance A 130A may set a cookie associated with the client 110 to identify service instance B 130B. For example, an identifier (e.g. name, serial number, address, etc.) of service instance B 130B may be added to the cookie of the client 110. In some embodiments, the identifier may be added (or injected, inserted, etc.) to an existing cookie of the client 110, or may be added by creating a new cookie for the client 110. The cookie may be any suitable type of cookie (e.g. session cookie, persistent cookie, etc.) associated with (e.g. stored by) the client 110 (or an application of the client device) that may be accessed by the load balancer. For example, the cookie may be included (or set) as part of an HTTP header when a connection is created (or attempted) between the client 110 and service instance A 130A.

Accordingly, in 207, the cookie may be stored by the client 110. In some embodiments, an application of the client 110 may store the cookie, which is later accessed by the load balancer 115. In some embodiments, the cookie may be an application-controlled (or service-controlled) cookie. For example, the service may determine the duration of the session for which the load balancer 115 should direct requests to the specified service instance. For example, the duration may also be specified in the cookie and the load balancer 115 may be configured to adhere to the specified duration.

Next, a process to connect (or reconnect) the client 110 with the appropriate service instance may be initiated. In some embodiments, after service instance A 130A determines it is not the elected leader for the requested topic stream, service instance A 130A may deny the request to establish a communication session. Alternatively, if a communication session has already been established, service instance A 130A may end the communication session and initiate a process to establish a communication session with the leader of the requested topic stream. For example, service instance A 130A may initiate a process to connect the client 110 with service instance B 130B instead of service instance A 130A. For example, in 208, service instance A 130A may initiate a subsequent request to obtain data from topic stream #1. In some embodiments, the subsequent request may include a second attempt to connect to the service. For example, in 209, the client 110 may submit a subsequent request to obtain data from topic stream #1. In some embodiments, the subsequent request may include attempting to establish (or re-establish) a communication session with the service.

As described, the load balancer 115 may be configured to implement session persistence (or session stickiness) such that an affinity (or binding) between the client device 110 and a particular service instance (or server) is retained for the duration of a session. Accordingly, the load balancer 115 may analyze the subsequent request and determine whether a cookie of the client 110 identifies a particular instance of the server. In this example, the load balancer 115 may determine during the subsequent request that the cookie stored by client 110 does identify a particular instance of the service. As described earlier, in response to a determination that service instance B 130B was the elected leader for the requested topic stream, service instance A 130A updated the cookie of the client 110 to include an identifier for service instance B 130B. Accordingly, in 210, the load balancer 115 may direct the subsequent request (or reconnection request) to the service instance B 130B (e.g. the service identified by the cookie) based on the updated cookie. As a result, in 211, service instance B 130B may receive the subsequent request. Accordingly, service instance A 130A has successfully leveraged the implementation of session persistence by the load balancer 115 to cause the load balancer 115 to redirect the subsequent request to service instance B 130B (e.g. the elected leader of the requested topic stream) despite the client 110 being previously directed to (or connected with) service instance A 130A.

In some embodiments, upon receiving the subsequent request, service instance B 130B may determine whether it is the elected leader for the requested topic stream. For example, service instance B 130B may determine that it is in fact the leader for topic stream #1, and in response, create (or accept a request to establish) a communication session between the client 110 and service instance B 130B. In other words, the client 110 may now be connected to service instance B 130B, which may include completing (accepting, confirming, etc.) the previously attempted communication session. In 212, service instance B 130B may provide topic stream #1, which is then received by the client 110 in 213.

As a result of the coordination of the service instances, the client 110 may efficiently be directed (or redirected) to the elected leader of the topic stream. Moreover, in some embodiments, the coordination between service instances (e.g. leader election, mapping table management, updating of cookies, indirect rerouting of requests, etc.) can be performed in a manner that does not require direct knowledge or intervention by the load balancer 115. For example, the redirection of requests may be independently implemented by the service instances by leveraging the configuration of the load balancer 115. In other words, the redirection of streaming requests may be abstracted from the load balancer 115, which is instead, handled at the service (e.g. application) level.

Figure 3:
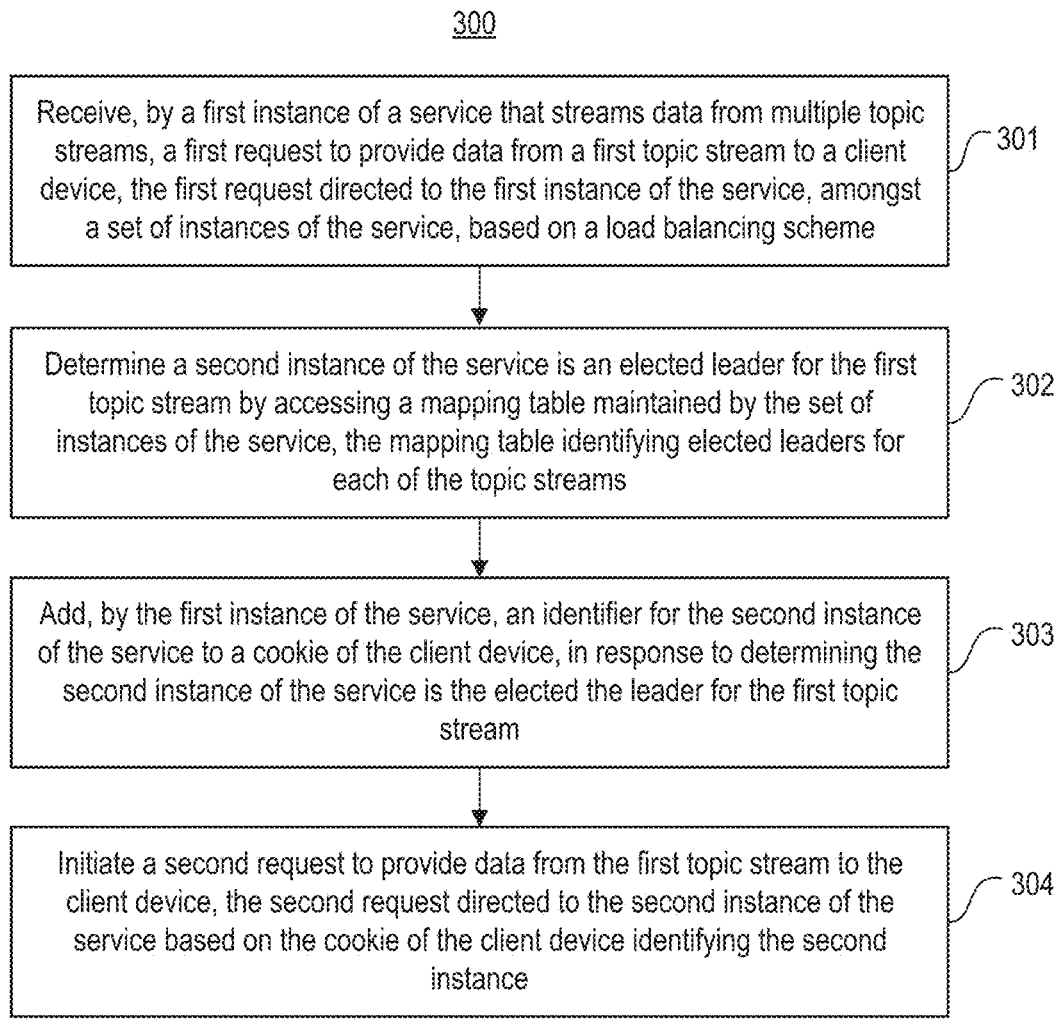
FIG. 3 is a process flow diagram illustrating an example method of distributing requests to stream data amongst instances of a streaming service according to one or more embodiments of the disclosure.

FIG. 3 is a process flow diagram 300 illustrating an example method of distributing requests to stream data amongst instances of a streaming service according to one or more embodiments of the disclosure. Process 300 may use processing logic, which may include software, hardware, or a combination thereof. For example, process 300 may be performed by a system including one or more components described in the operating environment 100.

In 301, the system (e.g. first service instance) may receive a first request to provide (or stream) data from a first topic stream to a client device (e.g. client 110). In some embodiments, the first request may be received by a first instance of a service (e.g. service instance A 130A). As described, the service (or streaming service) may stream data from multiple topic streams to multiple clients. In some embodiments, the first request may be directed to the first instance of the service, amongst a set of instances of the service, based on a load balancing scheme. For example, the first request may be directed to the first instance of the service by a load balancer (e.g. load balancer 115). As described, the load balancer may be configured to maintain session persistence. In some embodiments, the load balancer may maintain session persistence based on a cookie associated with the client device.

In some embodiments, the first request may be directed to the first instance of the service based on the load balancing scheme in response to determining the cookie of the client device during the first request does not identify a particular instance of the service. For example, the cookie may not specify a resource (e.g. service instance) to which the load balancer should attempt to maintain session persistence. For example, the first request may be an initial request to stream data, and therefore, an instance of the service may not have yet updated (or created) the cookie. As described, in some embodiments, the cookie may be an application-controlled (or service-controlled) cookie created by the service.

In some embodiments, the first request to provide data from the first topic may include a first attempt to establish a communication session. For example, the first request may include the client attempting to establish a communication session with the first instance of the service.

In 302, the system may determine a second instance of the service (e.g. service instance B 130B) is an elected leader for the first topic stream. In some embodiments, the system may determine the second instance of the service is an elected leader for the first topic stream by accessing a mapping table. For example, the mapping table may identify elected leaders for streaming each of the topic streams. In some embodiments, the mapping table may be maintained by the set of instances of the service.

In some embodiments, the first instance of the service may deny the first attempt to establish the communication session, in response to determining the second instance of the service is the elected leader for the first topic stream.

In 303, the system may add an identifier (e.g. name, serial number, address, etc.) for the second instance of the service to a cookie of the client device. In some embodiments, the system may add the identifier to the cookie in response to determining the second instance of the service is the elected the leader for the first topic stream. In some embodiments, the identifier may be added to the cookie by the first instance of the service. In some embodiments, the identifier may be added to the cookie after the client device establishes (or attempts to establish) a communication session with the first instance of the service. In some embodiments, the cookie may be used to identify a particular instance of the service with which to establish (or re-establish) a communication session with the client device. For example, the load balancer may be configured to read the cookie to maintain session persistence (or session stickiness).

In 304, the system may initiate a second request to provide data from the first topic stream to the client device. In some embodiments, the second request may be directed to the second instance of the service based on the cookie of the client device identifying the second instance. In some embodiments, the second request may be directed to the second instance of the service by the load balancer. In some embodiments, the second request to provide data from the first topic stream may include a second attempt to establish the communication session. For example, initiating the second request to provide data from the first topic stream to the client device may include attempting to re-establish the communication session with the client device. For instance, the second request may include the client attempting to establish a communication session with the second instance of the service.

In some embodiments, the second instance of the service may accept the second attempt to establish the communication session, in response to determining the second instance of the service is the elected leader for the first topic stream.

In some embodiments, the second request may be directed to the second instance of the service by overriding the load balancing scheme in response to determining the cookie of the client device, during the second request, identifies the second instance of the service.

In some embodiments, the service (or instances thereof) may assign leaders to particular topic streams based on an election process. For example, the instances of the service may implement a consensus protocol (or algorithm) for the election process. In some embodiments, the system may initiate an election process to elect the second instance of the service, amongst the set of instances, as the leader for the first topic stream. Accordingly, in response to the election, the system may update the mapping table to identify the second instance of the service as the elected leader for the first topic stream.

Accordingly, in some embodiments, described is a method for instances of a service to coordinate the efficient distribution of streaming requests to the elected leader of the requested topic stream.

In some embodiments of the disclosure, the components as described above may be used in conjunction with an on-demand database service.

Figure 4:
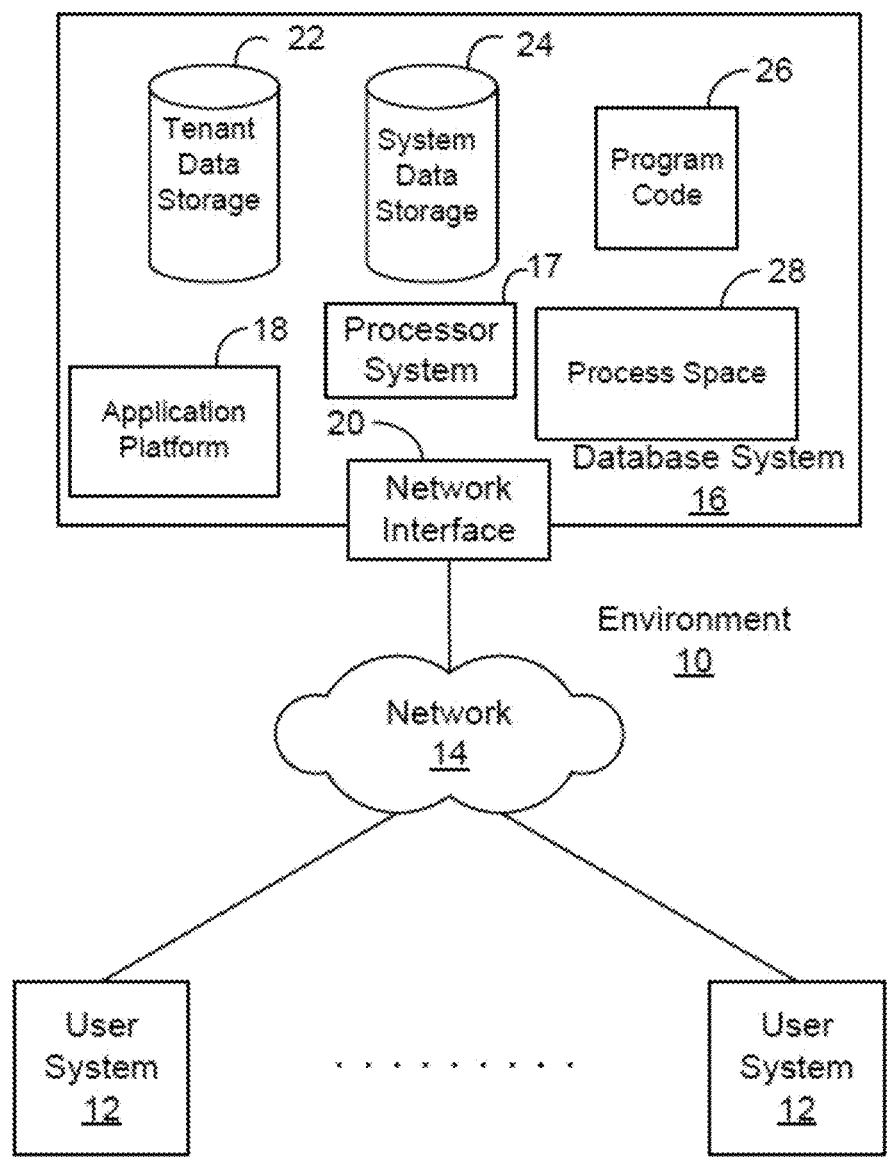
FIG. 4 is a block diagram illustrating an example environment in which on-demand database services may be used in conjunction with one or more embodiments of the disclosure.

FIG. 4 is a block diagram illustrating an example environment 10 in which on-demand database services may be provided to be used in conjunction with one or more embodiments of the disclosure.

Environment 10 may include user systems 12, network 14, database system 16, processor system 17, application platform 18, network interface 20, tenant data storage (or data store) 22, system data storage (or data store) 24, program code 26, and process space 28. In other embodiments, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As shown, user systems 12 might interact via a network 14 with an on-demand database service, which is implemented, in this example, as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some embodiments, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some embodiments, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one embodiment, system 16 may implement a web-based CRM system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

In one embodiment, an arrangement for elements of system 16 may include a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in this example include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one embodiment, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the embodiments described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed embodiments can be realized in any programming language that can be executed on a client system and/or server or server system such as, for example, C, C++, HTML, any other markup language, Java, JavaScript, ActiveX, any other scripting language, such as VBScript, and many other programming languages as are well known may be used.

According to some embodiments, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 5:
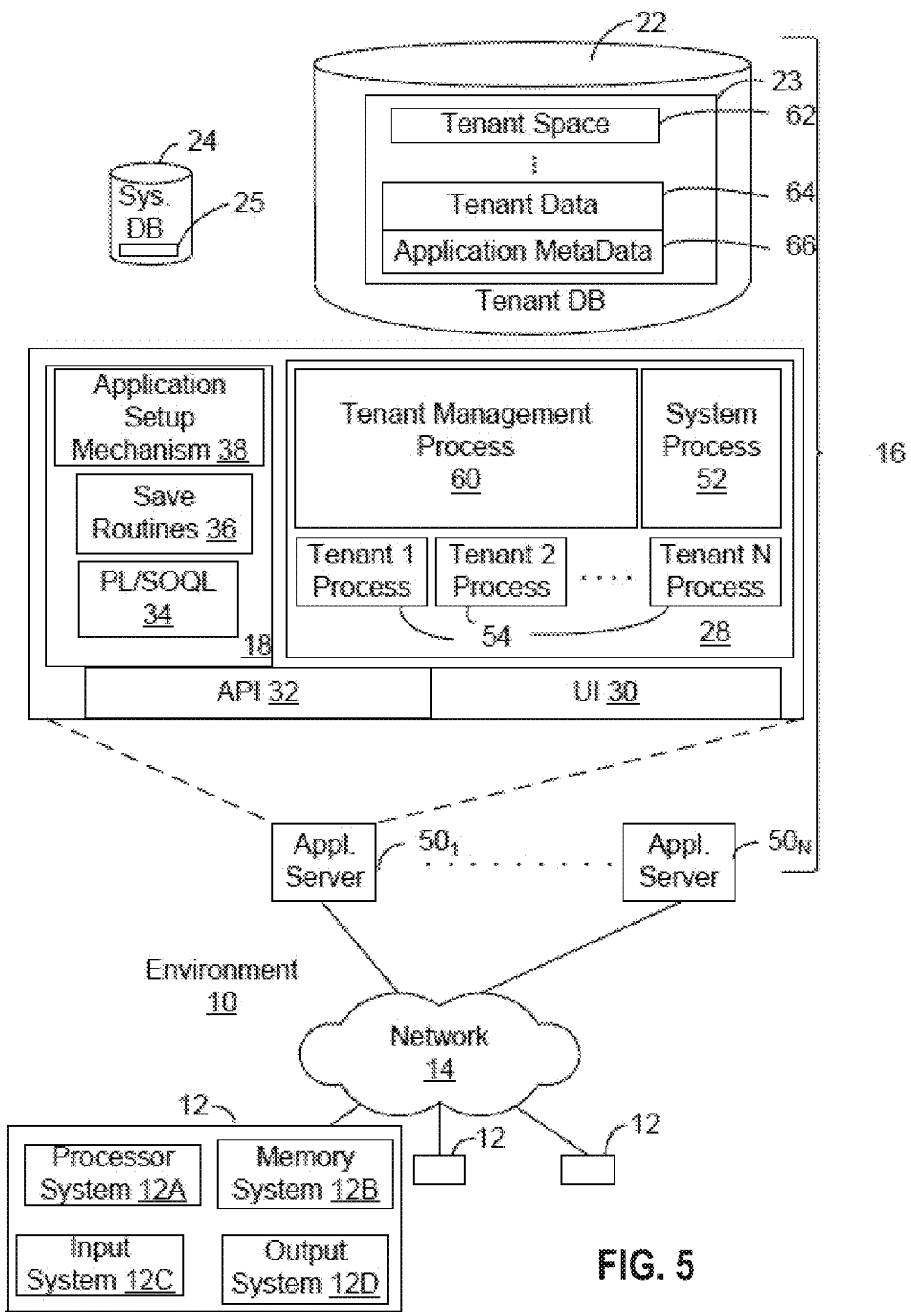
FIG. 5 is a block diagram illustrating an example of elements of FIG. 4 and various possible interconnections between these elements according to one or more embodiments of the disclosure.

FIG. 5 is a block diagram illustrating an example of elements of FIG. 4 and various possible interconnections between these elements according to one or more embodiments of the disclosure.

As shown, elements of system 16 and various interconnections in some embodiments are further illustrated. As shown, in one embodiment, the user system 12 may include processor system 12A, memory system 12B, input system 12C, and output system 12D. This example shows network 14 and system 16, and also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 501-50N, system process space 52, tenant process spaces 54, tenant management process space 60, tenant storage space 62, user storage 64, and application metadata 66. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown in this example, system 16 may include a network interface 20 implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Figure 6:
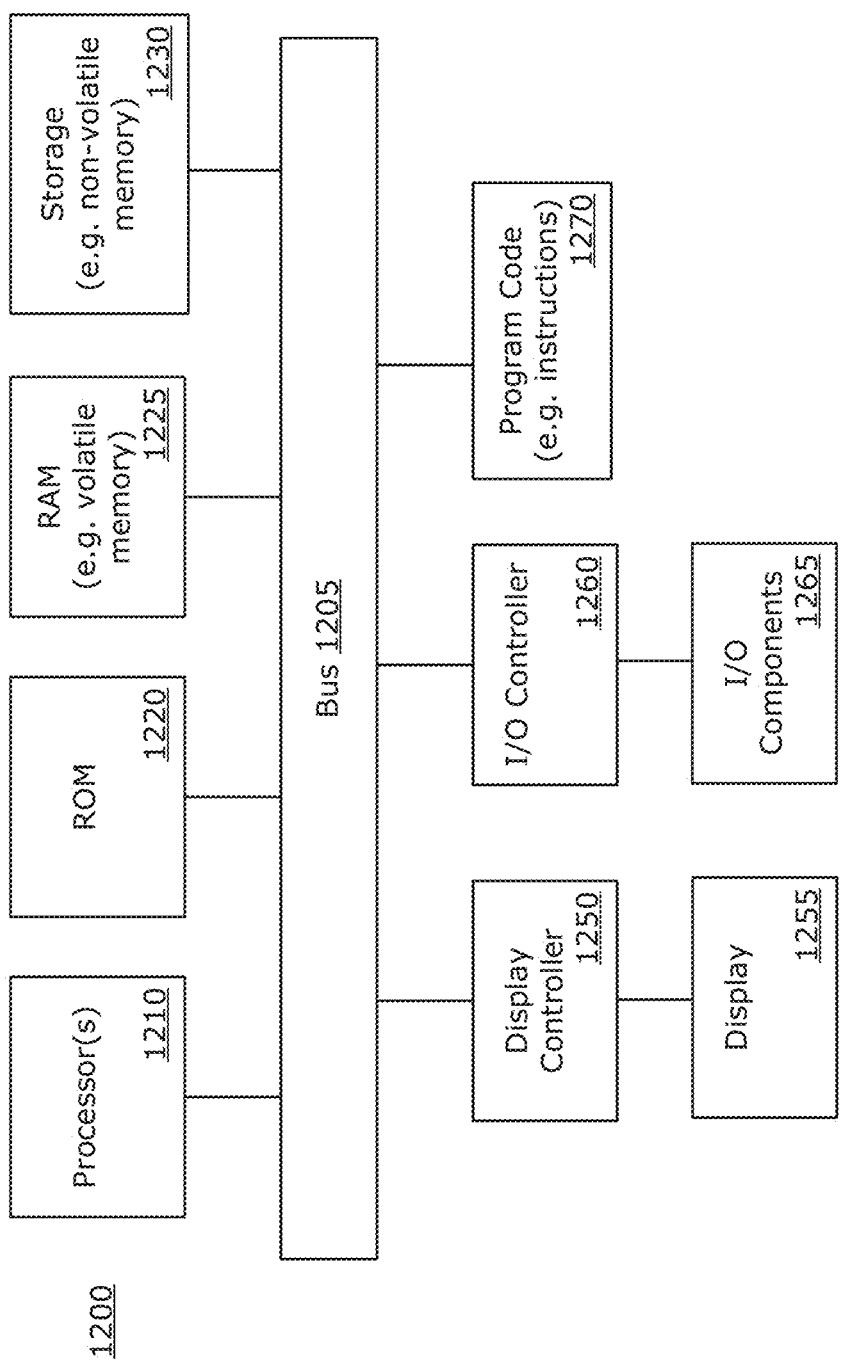
FIG. 6 is a block diagram illustrating an example of a computing system that may be used in conjunction with one or more embodiments of the disclosure.

FIG. 6 shows a block diagram of an example of a computing system that may be used in conjunction with one or more embodiments of the disclosure. For example, computing system 1200 (or system, or server, or computing device, or device) may represent any of the devices or systems (e.g. system 100, system 16, service instance 130 etc.) described herein that perform any of the processes, operations, or methods of the disclosure. As referred to herein, a system, for example, with reference to the claims, may include one or more computing systems that may include one or more processors. Note that while the computing system 1200 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor(s) 1210, ROM (Read Only Memory) 1220, RAM (or volatile memory) 1225, and storage (or non-volatile memory) 1230. The processor (or processors) 1210 may retrieve stored instructions from one or more of the memories 1220, 1225, and 1230 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein. As referred to herein, for example, with reference to the claims, a processor may include one or more processors. Moreover, the one or more processors 1210 may perform operations in a "cloud computing" environment or as a service (e.g. within a "software as a service" (SaaS) implementation). Accordingly, the performance of operations may be distributed among the one or more processors 1210, whether residing only within a single machine or deployed across a number of machines. For example, the one or more processors 1210 may be located in a single geographic location (e.g. within a home environment, an office environment, or a server farm), or may be distributed across a number of geographic locations.

The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 may represent any of the instructions, applications, software, libraries, toolkits, modules, components, engines, units, functions, logic, etc. as described herein (e.g. service instance 130). Program code 1270 may reside, completely or at least partially, within the memories described herein (e.g. non-transitory computer-readable media), or within a processor during execution thereof by the computing system. Program code 1270 may include both machine code, such as produced by a compiler, and files containing higher-level or intermediate code that may be executed by a computing system or other data processing apparatus (or machine) using an interpreter. In addition, program code 1270 can be implemented as software, firmware, or functional circuitry within the computing system, or as combinations thereof. Program code 1270 may also be downloaded, in whole or in part, through the use of a software development kit or toolkit that enables the creation and embodiment of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer-readable medium storing a plurality of instructions, which when executed, cause the one or more processors to:
receive, by a first instance of a service that streams data from multiple topic streams, a first request to provide data from a first topic stream to a client device, the first request directed to the first instance of the service, amongst a set of instances of the service, based on a load balancing scheme;
determine a second instance of the service is an elected leader for the first topic stream by accessing a mapping table maintained by the set of instances of the service, the mapping table identifying elected leaders for streaming each of the topic streams;
add, by the first instance of the service, an identifier for the second instance of the service to a cookie of the client device, in response to determining the second instance of the service is the elected the leader for the first topic stream; and
initiate a second request to provide data from the first topic stream to the client device, the second request directed to the second instance of the service based on the cookie of the client device identifying the second instance.

2. The system of claim 1, wherein the first request is directed to the first instance of the service and the second request is directed to the second instance of the service by a load balancer that is configured to maintain session persistence.

3. The system of claim 2, wherein the cookie is used by the load balancer to identify a particular instance of the service with which to maintain the session persistence.

4. The system of claim 1, wherein the first request is directed to the first instance of the service based on the load balancing scheme in response to determining the cookie of the client device during the first request does not identify a particular instance of the service.

5. The system of claim 1, wherein the second request is directed to the second instance of the service by overriding the load balancing scheme in response to determining the cookie of the client device during the second request identifies the second instance of the service.

6. The system of claim 1, wherein the first request to provide data from the first topic stream includes a first attempt to establish a communication session, and the second request to provide data from the first topic stream includes a second attempt to establish the communication session.

7. The system of claim 6, wherein the plurality of instructions, when executed, further cause the one or more processors to:
deny, by the first instance of the service, the first attempt to establish the communication session, in response to determining the second instance of the service is the elected leader for the first topic stream; and
accept, by the second instance of the service, the second attempt to establish the communication session, in response to determining the second instance of the service is the elected leader for the first topic stream.

8. The system of claim 1, wherein the plurality of instructions, when executed, further cause the one or more processors to:
initiate an election process to elect the second instance of the service, amongst the set of instances, as the leader for the first topic stream; and
update, in response to the election, the mapping table to identify the second instance of the service as the elected leader for the first topic stream.

9. A method comprising:
receiving, by a first instance of a service that streams data from multiple topic streams, a first request to provide data from a first topic stream to a client device, the first request directed to the first instance of the service, amongst a set of instances of the service, based on a load balancing scheme;
determining a second instance of the service is an elected leader for the first topic stream by accessing a mapping table maintained by the set of instances of the service, the mapping table identifying elected leaders for streaming each of the topic streams;
adding, by the first instance of the service, an identifier for the second instance of the service to a cookie of the client device, in response to determining the second instance of the service is the elected the leader for the first topic stream; and initiating a second request to provide data from the first topic stream to the client device, the second request directed to the second instance of the service based on the cookie of the client device identifying the second instance.

10. The method of claim 9, wherein the first request is directed to the first instance of the service and the second request is directed to the second instance of the service by a load balancer that is configured to maintain session persistence, and the cookie is used by the load balancer to identify a particular instance of the service with which to maintain the session persistence.

11. The method of claim 9, wherein the first request is directed to the first instance of the service based on the load balancing scheme in response to determining the cookie of the client device during the first request does not identify a particular instance of the service, and the second request is directed to the second instance of the service by overriding the load balancing scheme in response to determining the cookie of the client device during the second request identifies the second instance of the service.

12. The method of claim 9, wherein the first request to provide data from the first topic stream includes a first attempt to establish a communication session, and the second request to provide data from the first topic stream includes a second attempt to establish the communication session.

13. The method of claim 12, further comprising:

denying, by the first instance of the service, the first attempt to establish the communication session, in response to determining the second instance of the service is the elected leader for the first topic stream; and accepting, by the second instance of the service, the second attempt to establish the communication session, in response to determining the second instance of the service is the elected leader for the first topic stream.

14. The method of claim 9, further comprising:

initiating an election process to elect the second instance of the service, amongst the set of instances, as the leader for the first topic stream; and updating, in response to the election, the mapping table to identify the second instance of the service as the elected leader for the first topic stream.

15. A computer program product comprising a non-transitory computer-readable medium having a computer-readable program code embodied therein to be executed by one or more processors, the program code including instructions to:

receive, by a first instance of a service that streams data from multiple topic streams, a first request to provide data from a first topic stream to a client device, the first request directed to the first instance of the service, amongst a set of instances of the service, based on a load balancing scheme;

determine a second instance of the service is an elected leader for the first topic stream by accessing a mapping table maintained by the set of instances of the service, the mapping table identifying elected leaders for streaming each of the topic streams;

add, by the first instance of the service, an identifier for the second instance of the service to a cookie of the client device, in response to determining the second instance of the service is the elected the leader for the first topic stream; and initiate a second request to provide data from the first topic stream to the client device, the second request directed to the second instance of the service based on the cookie of the client device identifying the second instance.

16. The computer program product of claim 15, wherein the first request is directed to the first instance of the service and the second request is directed to the second instance of the service by a load balancer that is configured to maintain session persistence, and the cookie is used by the load balancer to identify a particular instance of the service with which to maintain the session persistence.

17. The computer program product of claim 15, wherein the first request is directed to the first instance of the service based on the load balancing scheme in response to determining the cookie of the client device during the first request does not identify a particular instance of the service, and the second request is directed to the second instance of the service by overriding the load balancing scheme in response to determining the cookie of the client device during the second request identifies the second instance of the service.

18. The computer program product of claim 15, wherein the first request to provide data from the first topic stream includes a first attempt to establish a communication session, and the second request to provide data from the first topic stream includes a second attempt to establish the communication session.

19. The computer program product of claim 18, wherein the program code includes further instructions to:

deny, by the first instance of the service, the first attempt to establish the communication session, in response to determining the second instance of the service is the elected leader for the first topic stream; and accept, by the second instance of the service, the second attempt to establish the communication session, in response to determining the second instance of the service is the elected leader for the first topic stream.

20. The computer program product of claim 15, wherein the program code includes further instructions to:

initiate an election process to elect the second instance of the service, amongst the set of instances, as the leader for the first topic stream; and update, in response to the election, the mapping table to identify the second instance of the service as the elected leader for the first topic stream.

* * * * *